Figure 1:
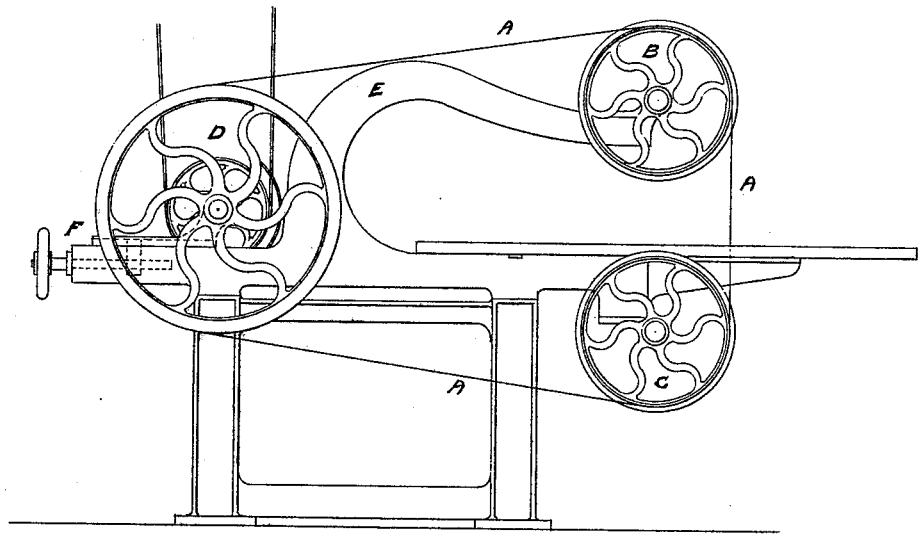

R. B. SANSON.
MACHINES FOR CUTTING CLOTH.

No. 181,107.            Patented Aug 15, 1876.

UNITED STATES PATENT OFFICE.

ROBERT B. SANSON, OF LONDON, ENGLAND.

IMPROVEMENT IN MACHINES FOR CUTTING CLOTH.

Specification forming part of Letters Patent No. 181,107, dated August 15, 1876; application filed March 25, 1876.

*To all whom it may concern:*

Be it known that I, ROBERT BELL SANSON, of London, in the county of Middlesex, England, have invented certain new and useful Improvements in Machinery for Cutting Cloth and other Materials, for which I have received a patent in England, No. 1,023, dated March 24, 1874; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to machinery for cutting cloth, wood, and other materials by means of an endless band, either plain or toothed, passed over pulleys, and driven by steam or otherwise.

The said invention consists in the peculiar means adopted for giving the required tension to the said band, to compensate for its expansion and contraction in working, and in the combination therewith of mechanism for adjusting the pulleys, and such construction of the machine-frame as will afford great space for the passage and manipulation of the cloth or other material being operated upon in the machine.

Endless-band machines for cutting cloth or wood have been heretofore provided with special springs and other appliances to compensate for the expansion and contraction of the band or saw; but my invention is distinct from any of these, and enables me to dispense with all such springs and other like means for effecting the desired purpose.

The means which I adopt are as follows: I construct my machine with a long arm, of cast-iron or other suitable metal, extending over the plate or table whereon the work is placed. This arm carries one of the pulleys over which the endless cutting band or blade is passed, and the sectional area of the metal of the said arm is so proportioned to its length and to the work which the machine has to perform that while strong enough to give the required support to the endless band, the said arm will yield or spring as far as is required to compensate for the expansion and contraction of the said endless band from variations of its temperature, or from any sudden strains or shocks to which it may be exposed in working.

The said endless band or blade is passed over three pulleys—one at the extremity of the spring or elastic arm, as above described, one below the table, and one at the back of the frame. The elastic arm may, therefore, be made of any desired length, so that I can obtain a large space under the said arm for the passage of the work, which may be manipulated with great freedom, to move it into any position while being cut.

This capability of adjusting the work into any required position, in connection with the above-described simple and inexpensive means for maintaining the proper tension of the endless band or blade, will enable me to supply a machine for cutting cloth which will be found more efficient, convenient, and durable, and at the same time much less expensive, than any machines heretofore known or used for this purpose.

I may combine with these improvements any ordinary or known means, such as screws, for adjusting the band-pulleys at the proper distance apart.

In some instances I construct my improved machine with the bearings of the driving-wheel shaft movable, so that the said driving-wheel may be adjusted instead of the aforesaid pulleys.

Figure 1 of the accompanying drawing is an elevation of the machine, showing the endless band, saw, or knife A passing over the guide-pulleys B, C, and the adjustable driving-wheel D. The pulley B is fixed to the end of the spring-arm E, which is so constructed as to give way before any shock or strain, and the driving-wheel D is fixed upon a slide, F, so that the wheel may be moved to compensate for the different lengths of the band and the various tensions required.

Figure 2:
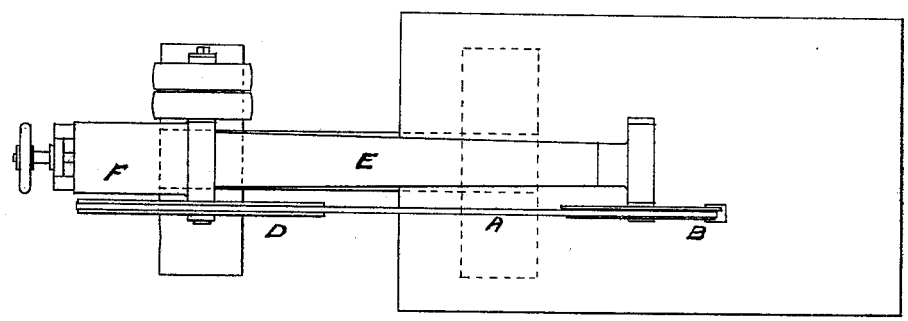

Fig. 2 is a plan of the machine.

Having now described my invention for improvements in machinery for cutting cloth and other materials, what I claim as my invention, and desire to secure by Letters Patent, is—

1. The combination of the band and its pulleys with the spring-arm E, as herein set forth.

2. The combination, with the band and its pulleys and spring-arm, of an adjusting mechanism for adjusting the pulleys, substantially for the purpose described.

In testimony that I claim the foregoing I have hereunto set my hand.

ROBERT BELL SANSON.

Witnesses:
ALEX. C. TWEEDIE,
WILLIAM BULL.